Jan. 22, 1952   M. FLINN   2,582,978
HYDRAULICALLY ACTUATED CARRY-TYPE EARTH SCRAPER
Filed Sept. 19, 1947   2 SHEETS—SHEET 1

Inventor
Myron Flinn

By *Clarence A. O'Brien and Harvey B. Jacobson*
Attorneys

Jan. 22, 1952  M. FLINN  2,582,978
HYDRAULICALLY ACTUATED CARRY-TYPE EARTH SCRAPER
Filed Sept. 19, 1947

Inventor
Myron Flinn

By
Attorneys

Patented Jan. 22, 1952

2,582,978

UNITED STATES PATENT OFFICE 2,582,978

HYDRAULICALLY ACTUATED CARRY-TYPE EARTH SCRAPER

Myron Flinn, Las Animas, Colo.

Application September 19, 1947, Serial No. 775,031

1 Claim. (Cl. 37—129)

This invention comprises novel and useful improvements in a hydraulic scraper and more particularly has reference to a trailer attachment adapted for engagement with a towing or tractor vehicle and operable from the hydraulic power system customarily associated therewith, for scooping, carrying and dumping material and scraping the same as desired.

The principal object of this invention resides in providing a simple construction of scoop for handling dirt or other materials as desired.

An important feature of the invention resides in the provision of a trailer scoop which may be readily attached to and operated by a tractor vehicle and which may be manipulated by the hydraulic operating means thereof.

A further feature of the invention consists in the provision of a trailer type of scoop which may be selectively operable from a single hydraulic operating means for scooping up material, and dumping the same as desired.

A further important feature of the invention resides in the provision of a trailer scoop as set forth in the preceding features and objects wherein the scooping, transporting and dumping positions of the device are achieved by selective manipulation of the single hydraulic operating means thereof.

And a final important feature of the invention resides in the provision of an apparatus conforming to the above mentioned objects and features which shall be of simple, inexpensive and dependable construction and which shall be highly efficient for the purposes intended.

These, together with various ancillary objects and features of the invention which will later become apparent as the following description proceeds, are attained by this device, a preferred embodiment of which has been illustrated, by way of example only in the accompanying drawings, wherein.

Referring now more specifically to the accompanying drawings, wherein like numerals designate similar parts throughout the various views, there is indicated at 10 a scoop of any suitable construction which is provided at its rearward and closed end with a downwardly extending, transversely and angularly disposed scraper or bull dozer blade 12. The scoop is open at its forward or other end, for receiving and discharging dirt and other material therefrom as set forth hereinafter.

Figure 5:
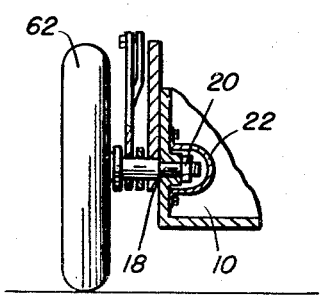

At its forward end, the scoop is provided with a draw bar or drafting frame designated generally at 14 and which at its forward extremity is provided with a coupling means 16 of any suitable construction by means of which the device may be attached to a tractor, truck or other towing vehicle. As shown more clearly in the detailed view in Figure 5, the side or sides of the scoop are provided with apertures to which are secured spindles or pivot shafts 18, the same being rigidly attached as by fastening nuts 20 which for protection are encased within a cover plate 22 inside the scoop and secured to the inner wall thereof. The drafting frame or draw bars 14 are provided with rearwardly extending parallel arms 24 which are pivoted upon the outwardly extending pivot pins or spindles 18. Thus, the drafting frame and scoop are pivotally connected by the aforementioned spindles or pivot pins 18 for relative inclined or oscillating movement with respect to each other.

Secured to and extending vertically from the outer surfaces of the scoop 10, are a pair of standards 26 whose upper extremities are connected to a tilting mechanism to be later described.

For lifting and tilting the scoop, the drafting frame 14 is provided with a pair of rigidly attached upwardly extending standards or supports 28, between which is journaled a crank shaft 30. Intermediate its extremities, the crank shaft is provided with a pair of parallel, rigidly connected crank arms 32 to which are connected as by a pivot pin 34, a rod 36 of a piston (not shown), operating in a hydraulic cylinder 38 whose closed extremity is pivoted as at 40 between a pair of supporting ears or lugs 42 rising from the drafting frame 14. It will thus be seen that as hydraulic pressure fluid is supplied or withdrawn from the cylinder 38 from a conduit 44 connected with the hydraulic operating mechanism of the towing vehicle, the crank shaft 30 is rocked or rotated in its bearings in the support 28 by means of the pivotal engagement of the crank arms 32 with the piston rod 36.

At opposite extremities of the crank shaft 30, are provided a pair of rigidly connected arms 46 which constitute the crank arms for tilting the scoop.

Figure 1:
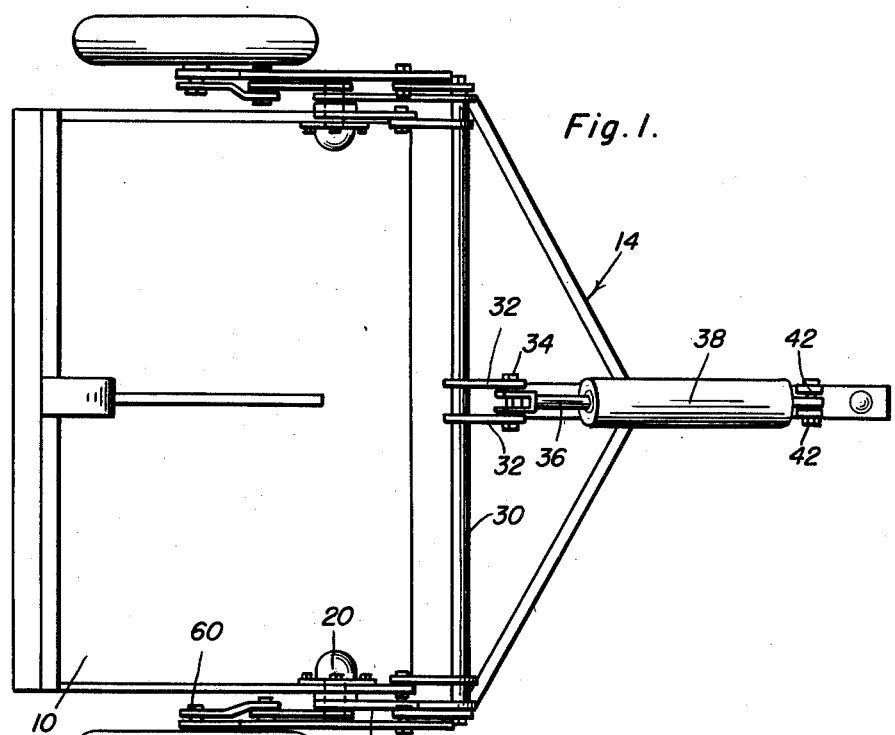
Figure 1 is a top plan view of the trailer scoop in accordance with the present invention.
Figure 2:
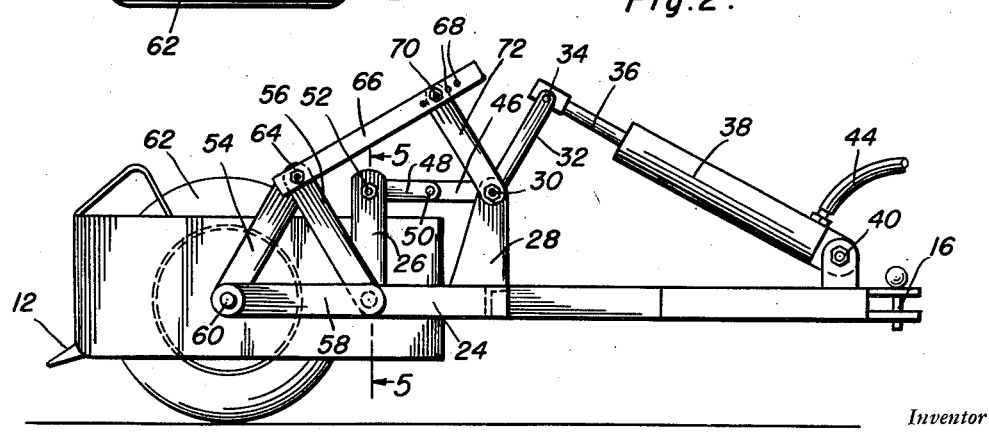
Figure 2 is a side elevational view of the apparatus in accordance with Figure 1, the scoop being shown in its holding or carrying position.
Figure 3:
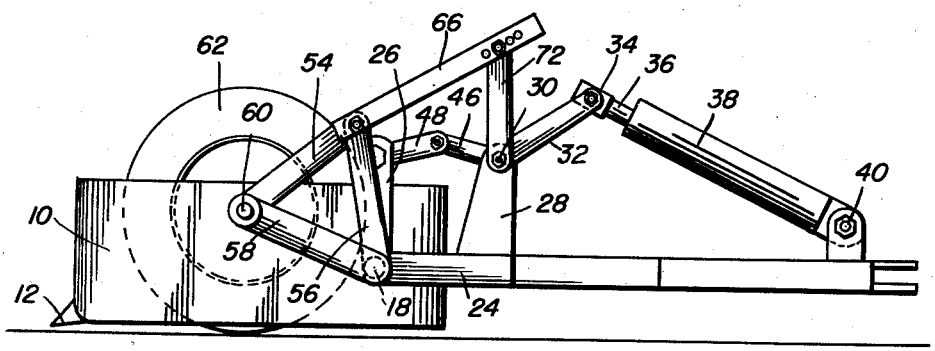
Figure 3 is a view similar to Figure 2 but showing the device in its scraping or scooping position.
Figure 4:
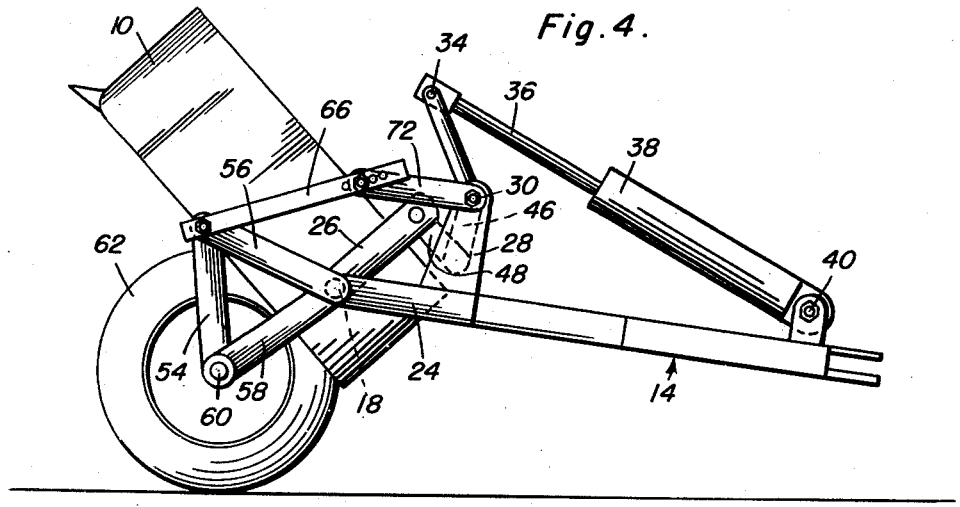
Figure 4 is a view similar to Figures 2 and 3 but illustrating the device in its dumping position; and, Figure 5 is a detailed view taken in vertical section substantially upon the plane of the transverse section indicated by the line 5—5 of Figure 2 and illustrating certain structural details of the device.

Connecting links 48 are pivoted to the arms 46 and to the standards or posts 26 as at 50 and 52 respectively. It will thus be seen that as the crank shaft is rocked by the hydraulic actuating mechanism, the arms 46 by means of the connecting links 48 and the leverage offered by the standards 26, rotate the scoop 10 about the pivot axis of the spindles 18, to thereby incline the scoop relative to the drafting frame as indicated in Figures 2, 3 and 4.

Attention is now directed more specifically to the means for elevating the scoop. For this purpose, each of the spindles 18 has journaled thereon a carriage which may be of any suitable shape but as shown is of triangular configuration, being composed of the members 54, 56 and 58. The members 56 and 58 are journaled upon the above mentioned pivot pin or spindles 18, whereby the triangular frame may be oscillated about this spindle or pin, while the members 54 and 58 are connected by an outwardly and laterally extending stub axle 60 upon which is journaled a supporting wheel of the scoop. It will thus be seen that as the triangular frame is oscillated about the pivot pin or spindle 18, the axle 60 and the wheel 62 are likewise oscillated about that axis, whereby the wheel is relatively raised or lowered with respect to the scoop, as shown in the positions of Figures 2, 3 and 4.

To effect this oscillation of the carriage about the spindles 18, the members 54 and 56 are connected by a fastening means 64 to which is secured a connecting rod 66. The other extremity of the connecting rod is selectively attached by means of one of a plurality of apertures 68 and a fastening pin or bolt 70, to a crank arm 72 carried by the crank shaft 30. It will thus be seen that as the crank shaft 30 is rocked, operation of the connecting rod 66 causes the triangular carriage to rock about its fulcrum pin the spindle 18, and thereby raise or lower the wheel 62 with respect to the scoop.

The operation of the device is as follows: With the hydraulic operating means in its most retracted position, as shown in Figure 3, and the crank shaft rocked to its extreme clockwise position as viewed in Figure 3, the connecting rod 66 is moved to its right hand position, thereby rocking the carriage about the spindle 18 in a clockwise direction, thus raising the wheels with respect to the scoop, and lowering the latter until the blade 12 and bottom of the scoop engage the ground or other surface upon which the apparatus is placed. Now, as the device is towed, the scoop is filled by material from the front open end thereof; as the device is pushed, the bull dozer blade 12 serves as a scraper, grader or the like.

When the hydraulic mechanism is operated to an intermediate position, as shown in Figure 2, the elevating mechanism consisting of the crank arm 72, connecting rod 66, triangular carriage and wheels carried thereby are rocked in a counter-clockwise direction about the spindle 18, and the wheels are lowered to their normal position, whereby the scoop is raised to the substantially horizontal position shown in Figure 2. In this position, the device is ready for transporting material contained within the scoop as desired.

Upon the extreme outward movement of the hydraulic mechanism, as shown in Figure 4, the crank shaft is rotated into its extreme counter-clockwise position, thereby forcing the connecting rod 66 into its extreme left position, thereby lowering the wheels to their maximum extent and raising the scoop to its maximum height. During this movement, it will be noted that the tilting cranks 46 on the crank shaft have moved from their substantially horizontal position shown in Figures 2 and 3, to their lowermost position as shown in Figure 4, thus pulling forward the connecting link 48, and by means of the lever standard 26, tilting the scoop about the axis passage through the spindle 18, into the position of Figure 4. Accordingly, the contents of the scoop may now be discharged until by means of hydraulic operation the devices are restored to their normal positions.

It will be here noted that by properly adjusting the distance between the members 56 and 72 by means of the apertures 68 and the pivot pins 70, the relative height of the scoop above the ground may be regulated and varied as desired.

From the foregoing, the manner of operating the device will be readily understood and further explanation is believed to be unnecessary.

Since numerous modifications will readily occur to those skilled in the art after a consideration of the foregoing specification and attached drawings, it is not intended to limit the invention to the exact construction shown and described, but all suitable equivalents and modifications may be resorted to, falling within the scope of the appended claim.

Having described the invention, what is claimed as new is:

In a scraper, a frame having laterally spaced rear portions, a pair of triangular frames each having a forward apex, an upper apex and a rear apex, a scoop disposed between said rear portions and having its sides pivoted to the rear portions, said triangular frames being pivoted at their forward apices to the rear portions, said scoop and the forward apices of said triangular frames being pivoted to the rear portions by common pivot pins, a transverse crank shaft journalled on said frame, a linkage connecting said crank shaft to the scoop and further linkages connecting the crank shaft to the upper apices of the triangular frames for oscillation of said scoop and said triangular frames upon rotation of said shaft, a wheel journalled to the rear apex of each triangular frame, and means carried on said frame and connected to said crankshaft for rotation of said shaft, said frame having upstanding supports on which the crank shaft is journalled, said crank shaft having circumferentially spaced first, second and third arms thereon, said linkage including an upstanding extension on said scoop, a link having its terminals pivoted to said first arm and said extension, said further linkages comprising connecting rods each connecting a second arm to an upper apex, said means for rotating said crank shaft forming a connection between said third arm and said frame.

MYRON FLINN.

REFERENCES CITED

The following references are of record in the file of this patent:

UNITED STATES PATENTS

| Number | Name | Date |
| --- | --- | --- |
| 1,863,861 | LeBleu | June 21, 1932 |
| 2,008,178 | Harrison | July 16, 1935 |
| 2,262,283 | Henry et al. | Nov. 11, 1941 |
| 2,304,441 | Brodersen et al. | Dec. 8, 1942 |
| 2,308,534 | Paulsen | Jan. 19, 1943 |
| 2,348,910 | Kadz | May 16, 1944 |
| 2,408,860 | Mork | Oct. 8, 1946 |